Aug. 20, 1968 N. E. HOFFMAN 3,398,232

CIRCUIT BOARD WITH INTERCONNECTED SIGNAL CONDUCTORS AND INTERCONNECTED SHIELDING CONDUCTORS

Filed Oct. 19, 1965 8 Sheets-Sheet 1

Aug. 20, 1968 N. E. HOFFMAN 3,398,232

CIRCUIT BOARD WITH INTERCONNECTED SIGNAL CONDUCTORS AND INTERCONNECTED SHIELDING CONDUCTORS

Filed Oct. 19, 1965 8 Sheets-Sheet 4

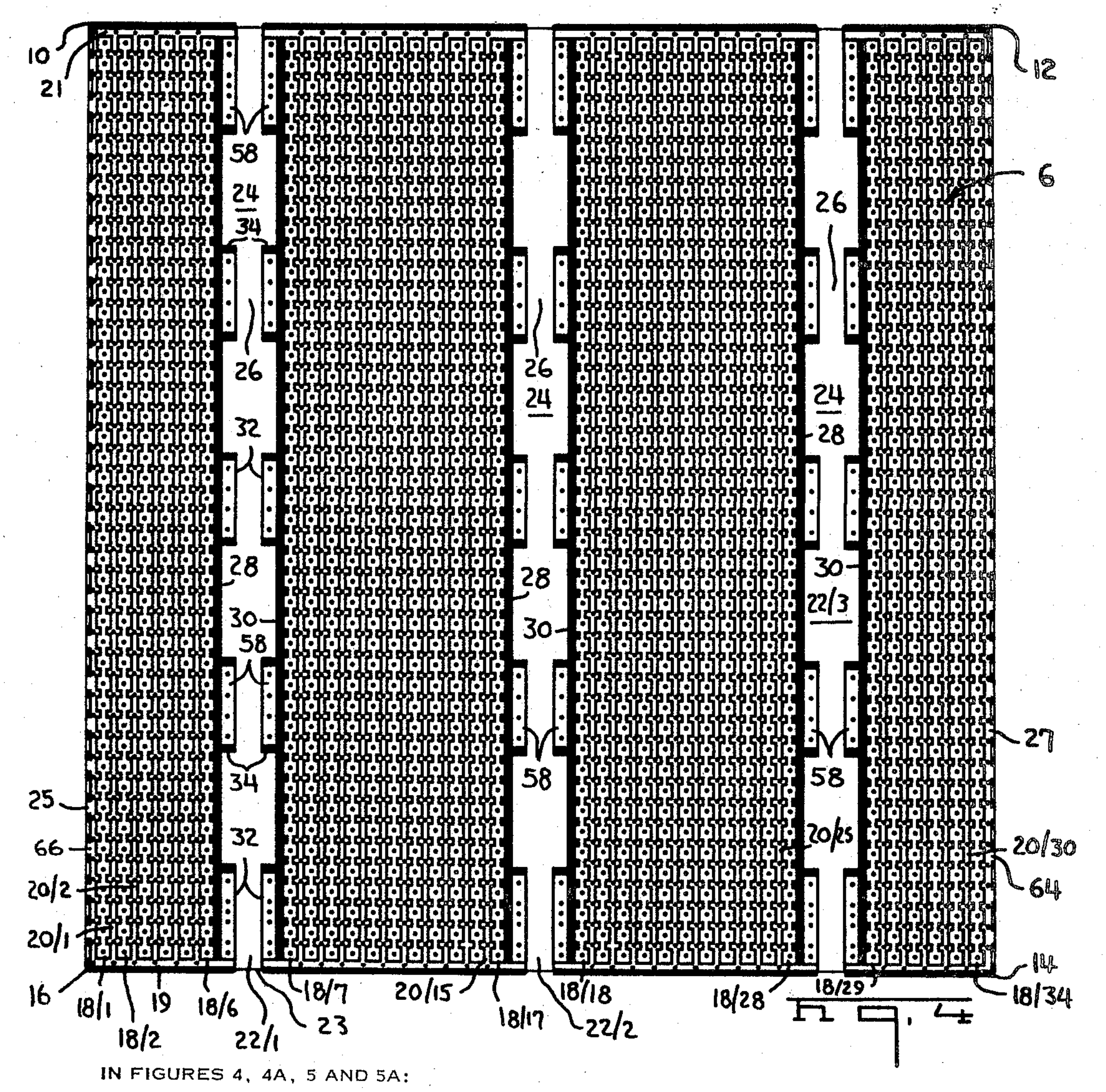

FIG. 4

IN FIGURES 4, 4A, 5 AND 5A:

DARK AREAS ARE OF INSULATING MATERIAL.
WHITE AREAS ARE OF METALLIC CONDUCTOR <u>EXCEPT</u>

1. THE BLACK DOTS IN THE SIGNAL CONDUCTORS REPRESENT CONDUCTING PIPES EXTENDING THROUGH THE BOARD AND ELECTRICALLY CONNECTING SIGNAL CONDUCTORS 18/1, 18/2, ETC. TO SIGNAL CONDUCTORS 44/1, 44/2, ETC. ON THE OPPOSITE SIDE OF THE BOARD. THE BLACK DOTS IN THE SHIELDING CONDUCTORS REPRESENT CONDUCTING PIPES WHICH ELECTRICALLY CONNECT SHIELDING CONDUCTORS 20/1, 20/2 TO SHIELDING CONDUCTORS 46/1, 46/2, ETC.

2. THE BLACK DOTS IN THE AREAS 58 REPRESENT CONDUCTING PIPES EXTENDING THROUGH THE BOARD AND ELECTRICALLY CONNECTING THESE AREAS WITH SELECTED SIGNAL AND SHIELDING CONDUCTORS ON THE OPPOSITE SIDE OF THE BOARD.

3. AT EACH END OF THE AREAS 58, A CONDUCTING PIPE EXTENDS THROUGH THE BOARD TO CONNECT THESE AREAS WITH THE ADJACENT AREAS 52 ON THE OPPOSITE SIDE OF THE BOARD, THESE PIPES BEING SHOWN IN FIGURE 6.

Aug. 20, 1968 N. E. HOFFMAN 3,398,232

CIRCUIT BOARD WITH INTERCONNECTED SIGNAL CONDUCTORS
AND INTERCONNECTED SHIELDING CONDUCTORS

Filed Oct. 19, 1965 8 Sheets-Sheet 7

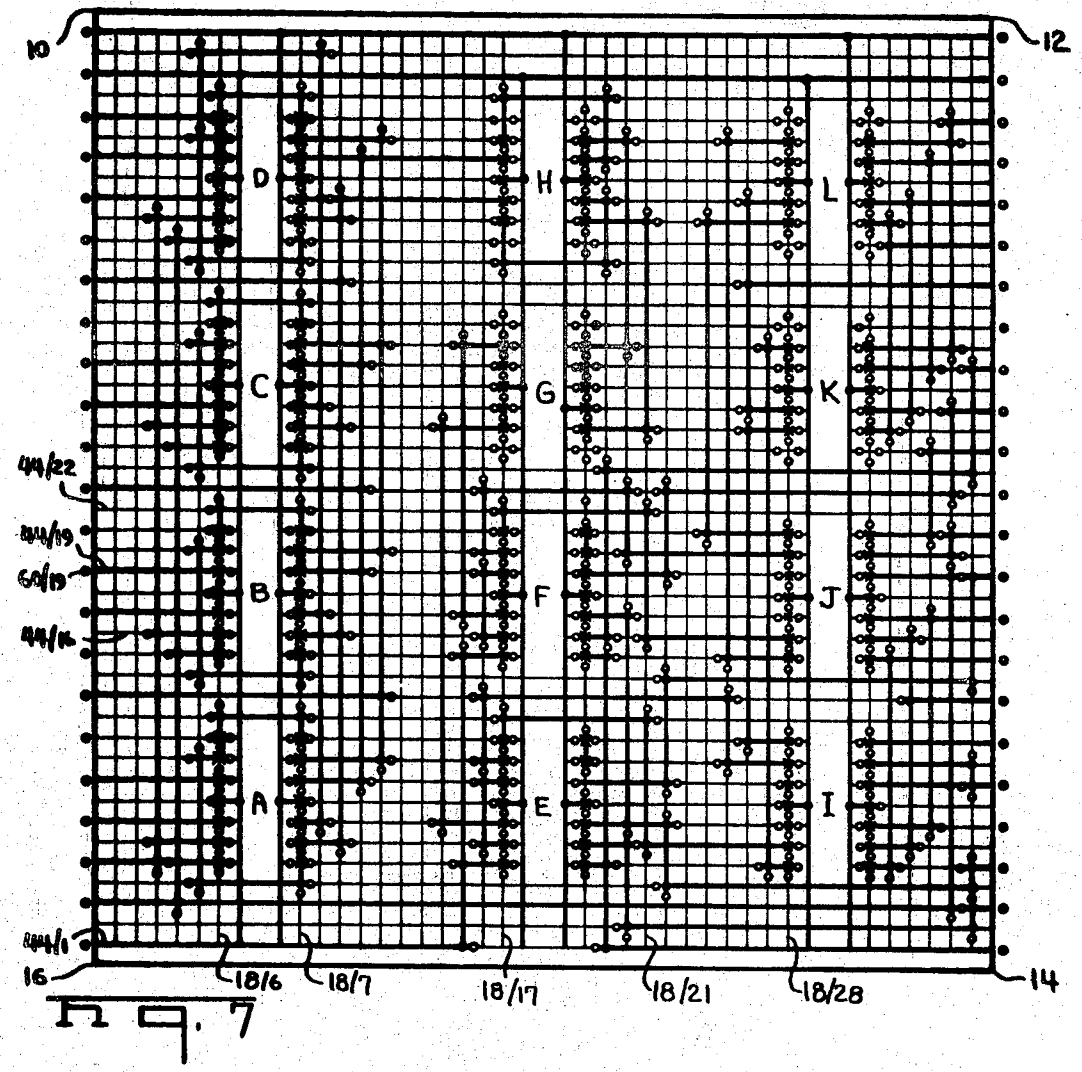

FIG. 7

X – COMPONENT LEAD o – CONDUCTOR INTERRUPT ● – SIDE TO SIDE CONNECTION

ACTIVE CONDUCTORS ———

INACTIVE CONDUCTORS ———

IN ADDITION TO THE DRILLED HOLES SHOWN, IT IS ASSUMED THAT THE BOARD WILL CONTAIN OTHER DRILLED HOLES (NOT SPECIFICALLY SHOWN IN THE INTEREST OF CLARITY) AS FOLLOWS:

ALL OF THE SIDE-TO-SIDE CONNECTIONS BETWEEN THE ACTIVE CONDUCTORS 44 AND ACTIVE CONDUCTORS 18 HAVE BEEN BROKEN BY DRILLING THE APPROPRIATE PIPES 40 EXCEPT THE CONNECTIONS SPECIFICALLY INDICATED BY A DARK CIRCLE. ALSO ALL OF THE SIDE-TO-SIDE CONNECTIONS BETWEEN ACTIVE AND INACTIVE CONDUCTORS HAVE BEEN BROKEN BY DRILLING.

United States Patent Office 3,398,232
Patented Aug. 20, 1968

3,398,232

CIRCUIT BOARD WITH INTERCONNECTED SIGNAL CONDUCTORS AND INTERCONNECTED SHIELDING CONDUCTORS

Norman Edwin Hoffman, Harrisburg, Pa., assignor to AMP Incorporated, Harrisburg, Pa.

Filed Oct. 19, 1965, Ser. No. 497,657
6 Claims. (Cl. 174—68.5)

ABSTRACT OF THE DISCLOSURE

Panel member for making interconnections among electrical components and integrated circuits has conductors on opposite faces extending at right angles to each other with conducting plugs or pipes connecting conductors at coordinate locations. In order to make a particular circuit device, appropriate components or integrated circuits are mounted on one side of the panel and selected ones of the plugs or pipes are drilled to break side-to-side connections. Additionally, conductors on both sides are drilled between pipes to interrupt specific conductors. Final conductors between components and integrated circuits are thus isolated by removing material from the board. This operation can be carried out by a conventional drilling apparatus.

This invention relates to circuit boards, particularly of a type intended for use with integrated circuit devices (flat packs) and/or micro-miniature discrete components such as individual resistors and capacitors. The embodiment of the invention disclosed herein is particularly adapted to be used with the interconnection system disclosed and claimed in my co-pending application Ser. No. 497,758, filed Oct. 19, 1965, although it can be used in other environments if desired.

The advent of extremely small integrated circuit devices and correspondingly small micro-miniature components has given rise to new problems in the field of circuit boards. One distinct advantage of these micro-miniature components and integrated circuit devices is their extremely small size, which, in turn, makes possible the packaging of a relatively large amount of complex circuitry in a small volume. In order to take advantage of this factor, the circuit boards on which the components and integrated circuits are mounted must be of a size commensurate with the size of the components. Prior art circuit boards, for the most part, are not suitable for use with these new devices because the prior art boards are entirely too large. Furthermore, many of the design principles and manufacturing techniques employed for prior art boards are not directly applicable to the design and manufacture of circuit boards for micro-miniature devices. In other words, if the manufacturing techniques used for conventional printed circuit boards were to be employed for boards for micro-miniature devices, the techniques would not be operative because of the extremely small size of the printed conductors and the density of conductors required on the board. The present invention is thus addressed to the problem of providing a circuit board which can, with practicality, be manufactured in a size which is commensurate with the size of micro-miniature circuit devices.

An object of the invention is to provide an improved circuit board on which micro-miniature circuit components and/or integrated circuit units are adapted to be mounted. A further object is to provide a circuit board having prearranged circuit paths thereon in accordance with an X-Y grid system. A further object is to provide a circuit board in which the particular circuit path desired when the board is put to use can be achieved by merely removing portions of an initially present arrangement of circuit paths. A further object is to provide a circuit board having a relatively high density of circuit paths thereon with each circuit path insulated from adjacent circuit paths and, if desired, with shielding material around each circuit path of the board. A still further object is to provide a circuit board having an improved heat dissipation arrangement to prevent the components mounted on the board from being heated to destructive or damaging temperatures.

These and other objects of the invention are achieved in a preferred embodiment comprising a generally rectangular board of suitable insulating material having a first group of parallel conductors on one side thereof and a second group of parallel conductors on its other side. The first group of conductors extends transversely of the second group so that the conductors of the two groups cross each other at coordinate locations on the board. A plurality of conducting plugs extend through the board at these points of intersection and electrically connect the first group of conductors with the second group. In accordance with one embodiment, shielding conductors are also provided on the board which extend alongside the parallel conductors of the two groups and these shielding conductors, although electrically independent of the signal conductors (i.e., the above-mentioned groups of conductors) are also connected by conducting plugs so that a continuous shielding network is provided. The integrated circuits and/or micro-miniature components are mounted on heat-sink members which extend across the board and which function to dissipate heat generated by the circuit components. The components or integrated circuits have their leads welded or otherwise connected to specific ones of the parallel signal conductors of the groups. Specific circuit paths between the components or circuit units are formed by drilling or otherwise removing portions of the parallel signal conductors and/or the plugs so that the initially present conducting grid system is interrupted to form specific circuit arrangements. The individual conductors of the groups extend to the edges of the board and make contact with suitable edge connectors which may be of a type disclosed in my co-pending application Ser. No. 497,758, filed Oct. 19, 1965.

In the drawing:

FIGURE 3 is a fragmentary perspective view showing an integrated circuit mounted on the board with its leads connected to circuits in the board;

FIGURE 4 is a plan view of the side of the board on which the components or integrated circuits are mounted;

FIGURE 8 is a perspective view similar to FIGURE 2 of an alternative form of circuit board in accordance with the invention.

Referring first to FIGURES 1–5A, a preferred form of circuit board in accordance with the invention is of rectangular shape having corners 10, 12, 14, 16 and comprises a continuous matrix of suitable insulating material such as diallyl phthalate or a relatively firm nylon. The side 6 (FIGURES 1A, 4, and 4A) is herein designated as the component side of the board for the reason that integrated circuit devices 17 and/or components are normally mounted thereon and the side 8 (FIGURES 1B, 5, and 5A) is designated as the underside although, in use, the board may be in any desired orientation. Under some circumstances and with some types of boards, the components and/or circuit devices might be mounted on both sides of the board, as will be explained below.

Figure 4A:
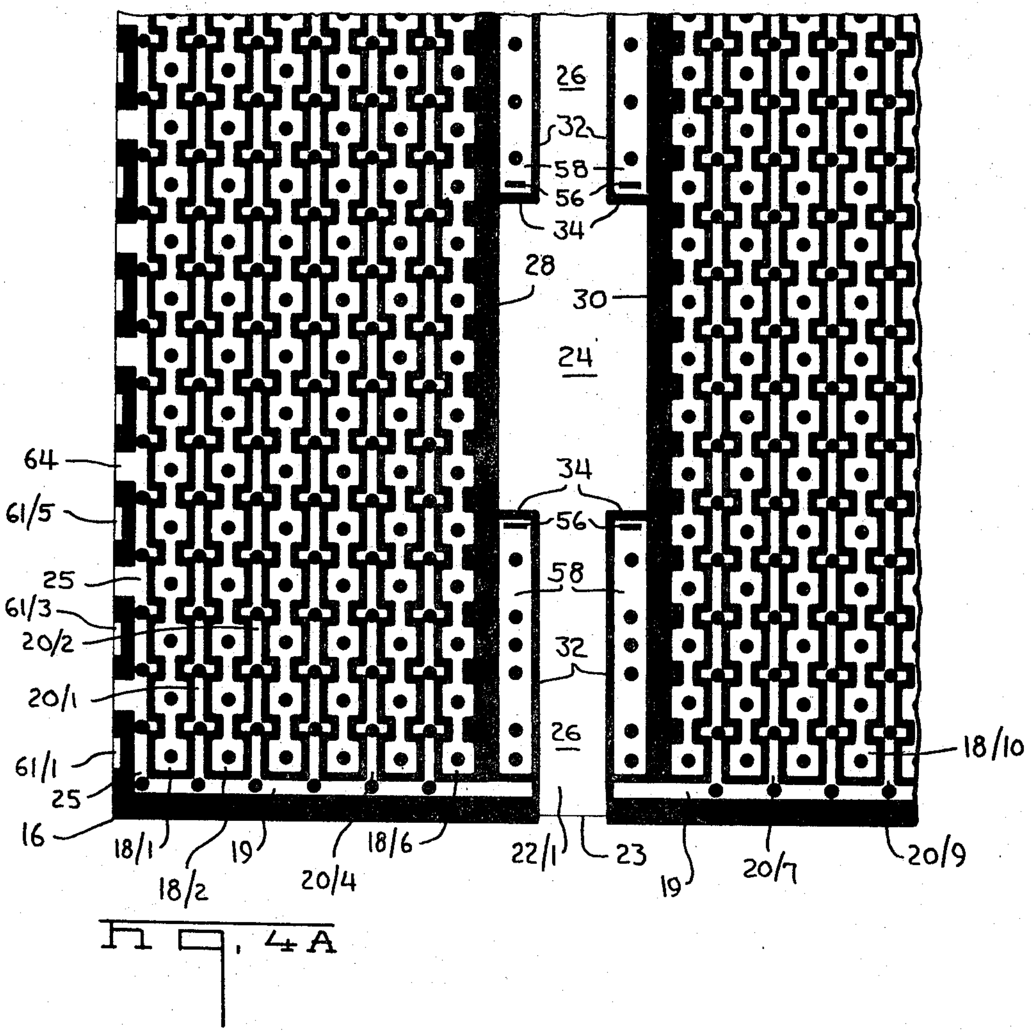
FIGURE 4A is a plan view similar to FIGURE 4 but showing the lower left-hand portion of FIGURE 4 on an enlarged scale.

A plurality of parallel signal conductors 18 extend vertically, as viewed in FIGURES 4 and 4A, on the component side 6. These conductors have their ends located near the edges 14–16 and 12–10 but do not extend to the edges. These signal conductors are specifically designated by the reference numerals 18/1, 18/2 * * * 18/34 to indicate their relative positions with respect to the corner 16 of the board. Shielding or ground conductors designated as 20/1, 20/2 * * * 20/30 also extend from the edge 14–16 to the edge 12–10 between the signal conductors. The shielding conductors are separated from the ground conductors by the insulating matrix and merge at their ends with common conducting areas 19 and 21 which extend along the sides 14–16 and 10–12 respectively. The common conducting areas 19 and 21, in turn, merge with conducting areas 25, 27 which extend along the sides 10–16 and 12–14 respectively. Additional structural details of these signal and ground conductors are set forth below.

A plurality of thermally conductive heat-sink strips or bands 22/1, 22/2, 22/3 extend from the edge 14–16 to the edge 10–12 and separate the signal and ground conductors 18, 20 into four groups, the center groups each having eleven signal conductors and the end groups each having six signal conductors with an appropriate number of shielding conductors. These heat-sink strips extend to the edges of the board as shown at 23 and are adapted to make contact with additional heat-dissipation means. For example, in my co-pending application Ser. No. 497,-758, filed Oct. 19, 1965, the edge portions of these heat-sink strips make contact with a metallic housing which provides additional radiating surface. Each heat-sink strip 22 has four equally spaced-apart relatively enlarged areas 24 on which the components or integrated circuit units 17 are to be mounted. Relatively narrow neck portions 26 extend between adjacent enlarged areas 24. Presently available integrated circuit units are normally provided with a metallic casing and the heat generated during operation of the circuit units is thus transmitted from the casings to heat-sink strips and dissipated. The heat-sink strips are electrically isolated from the signal and shielding conductors by the insulating matrix of the board and by insulating barriers 28, 30 which extend beside the strips. Each strip is connected plugs 50 (FIGURE 3) to additional heat radiating surfaces 48 on the side 8 as described below.

The neck portions 26 of these heat-sink strips are bordered by insulating barriers 32, 34 which extend from the barriers 28, 30. The barriers 32, 34 define isolated areas which contain conductive metal and which form part of the bus-bar system for the board also described below.

Figure 1A:
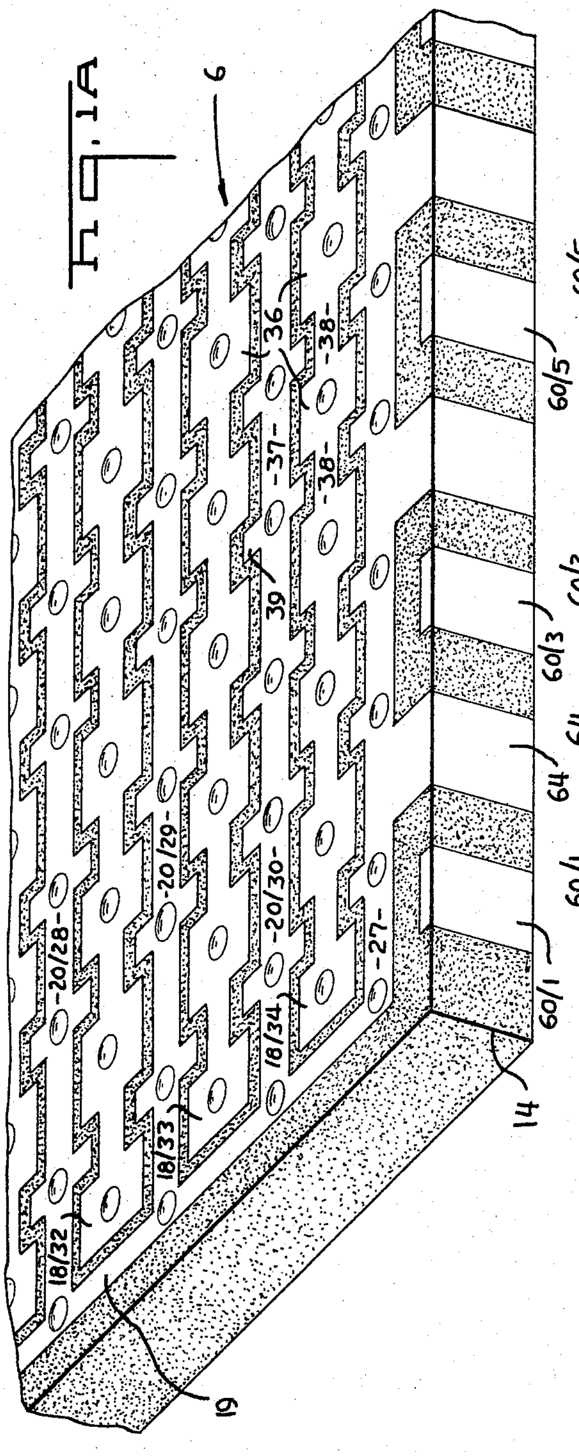
FIGURE 1A is a fragmentary perspective view of a corner portion of a circuit board in accordance with the invention showing the "upper" surface of the board.
Figure 1B:
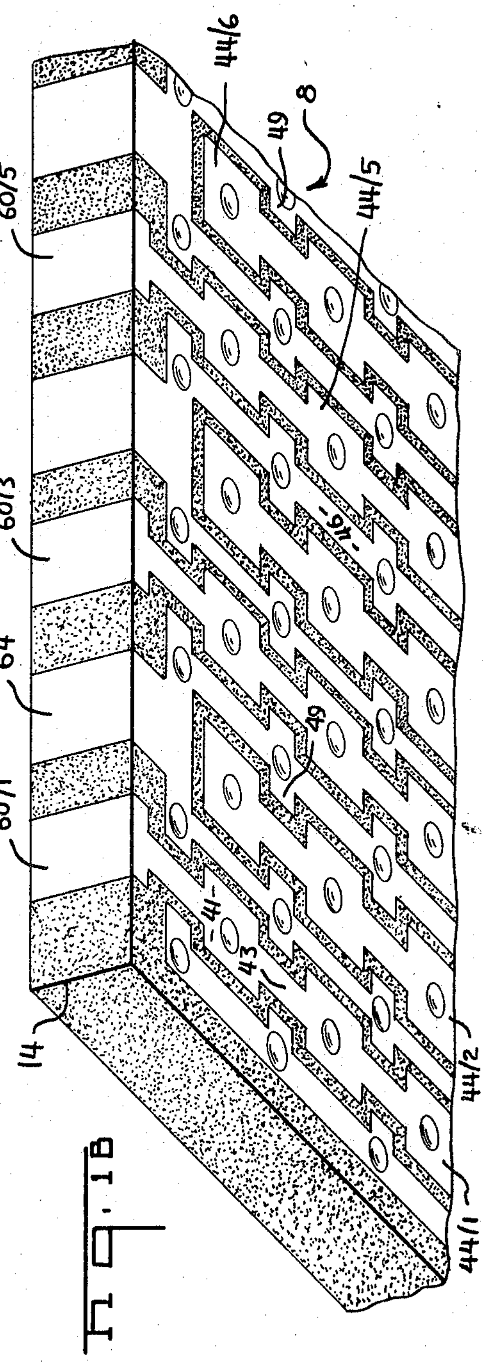
FIGURE 1B is a view similar to FIGURE 1A showing the "lower" surface of the board.
Figures 2, 5, 6:
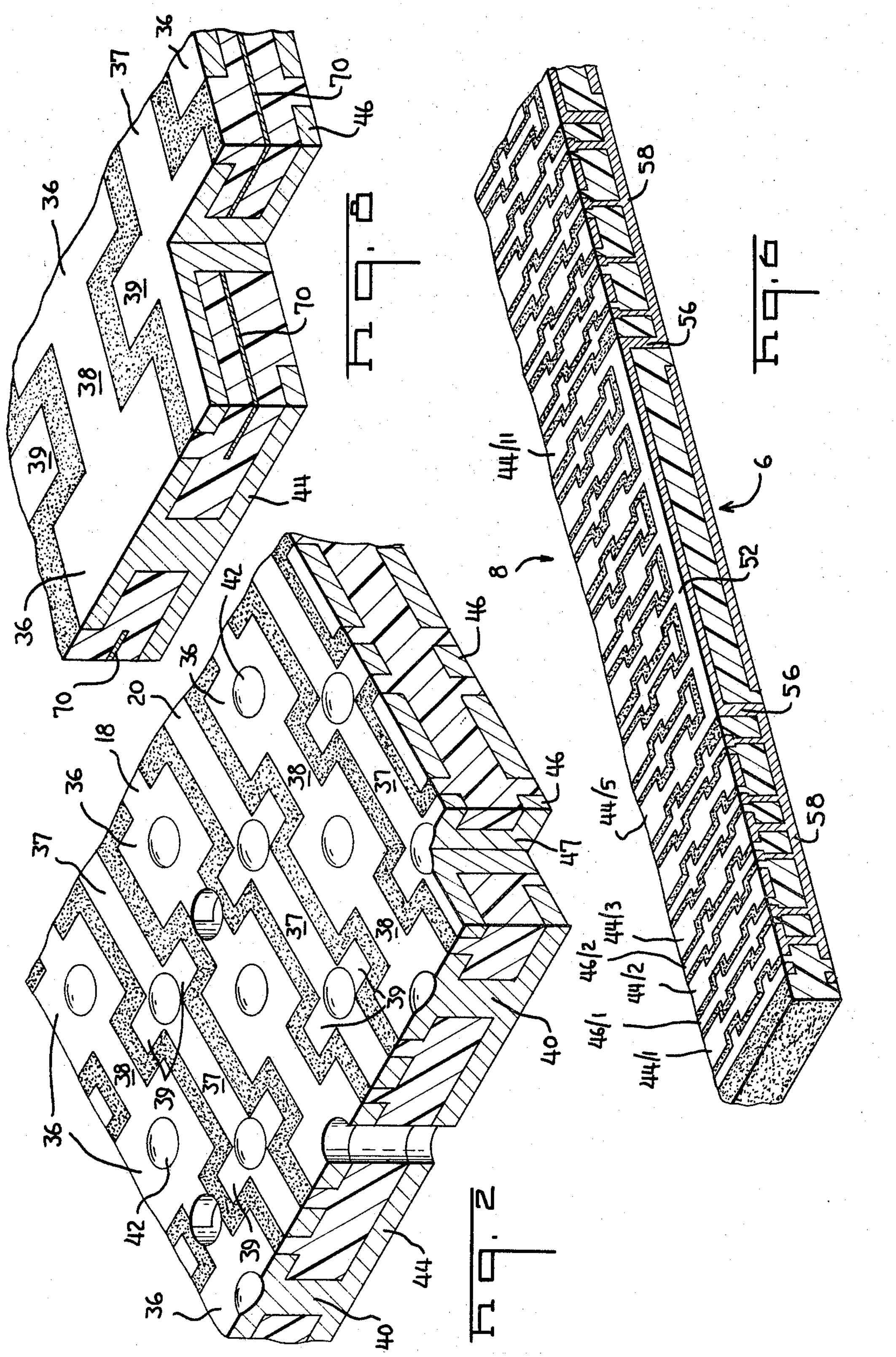
FIGURE 2 is a sectional perspective view taken through a central portion of the board.
FIGURE 5 is a plan view of the underside of the board.
FIGURE 6 is a view taken along the lines 6—6 of FIGURE 5A and illustrating the bus-bar arrangement for supplying power to, or leading shield conductors to, the individual components or integrated circuits.

As best shown in FIGURES 1 and 2, the individual signal conductors 18/1, 18/2, etc. each comprises a plurality of equally spaced-apart generally square pads 36 with adjacent pads being connected by neck portions 38. The shielding conductors 20 likewise comprise neck portions 37 and transversely enlarged areas or spurs 39, the enlarged areas of the shielding conductors extending towards the neck portions 38 of the adjacent signal conductors. The spurs 39 function as impedance compensating devices as will be explained below.

Figure 5:
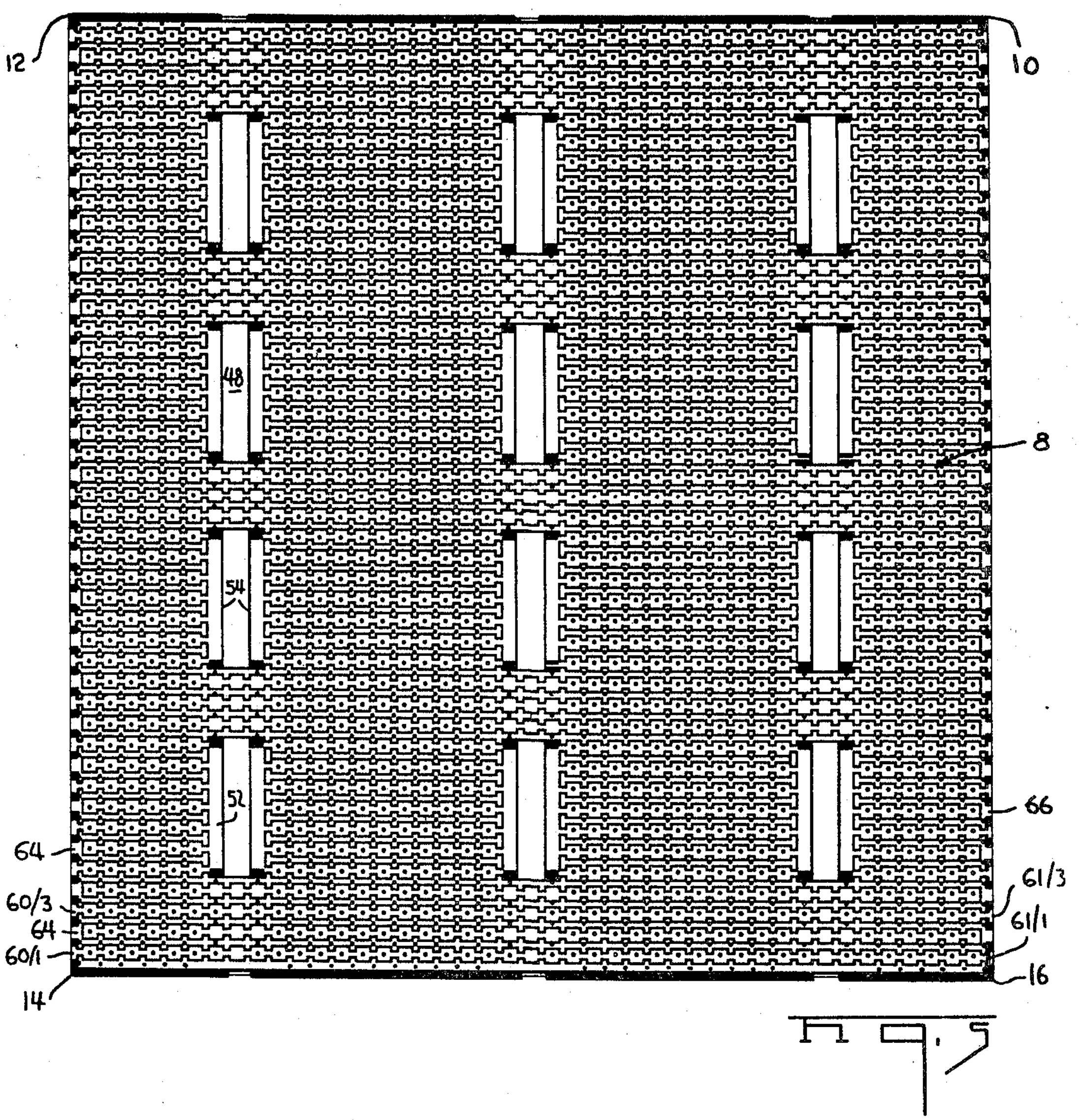
Figure 5A:
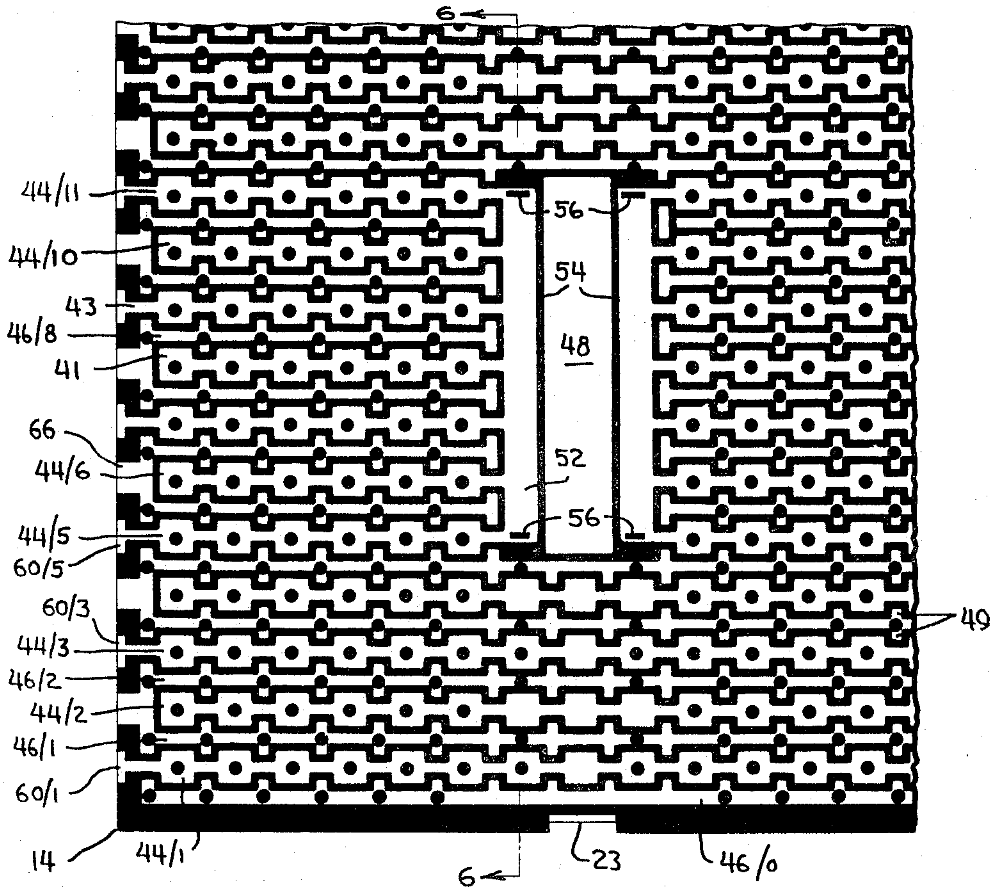
FIGURE 5A is a plan view similar to FIGURE 5 but showing the lower left-hand portion of FIGURE 5 on an enlarged scale.

The underside 8 of the board (FIGURES 1B, 5, and 5A) is provided with a plurality of signal conductors 44/1; 44/2 * * * 44/45 which extend transversely of the signal conductors 18 and from the edge 12–14 to the edge 10–16. Additionally, shielding conductors 46/1, etc. extend beside the signal conductors on the side 8. As shown in FIGURE 5A, a shielding strip 46/0 extends parallel to edge 14–16 and is connected by plugs to area 19. A similar shielding strip extends along the edge 10–12. The structural features of the signal and shield conductors on the side 8 are identical in the enclosed embodiment to the signal and shield conductors on the side 6. Thus, the signal conductors 44 have enlarged pads 41 and neck portions 43 and the shielding conductors 46 have impedance compensating spurs 49.

It will be apparent that since the conductors 44 and 46 on the side 8 extend normally of the conductors 18 and 20 on the side 6, the two groups of conductors establish a coordinate grid system with all of the conductors of one side crossing all of the conductors on the other side. The conductors 18 are electrically connected to the conductors 44 at these intersections by means of conducting plugs 40 which extend normally through the board as shown in FIGURE 2 from the centers of the pad portions 36 of the conductors 18 to the centers of the corresponding pad portions 41 of the conductors 44. Advantageously, these plugs are of circular cross-section and their location in the board is indicated as shown at 42 by a depression in the center of each pad or by other suitable means. The shielding conductors 20 of the side 6 are likewise electrically connected to the shielding conductors 46 by means of plugs 47 which are located in the centers of the enlarged areas 39 of the conductors 20.

The diameter of the plugs 39 and 40 is substantially equal to the widths of the conductors 20 and 46 and to the widths of the neck portions of the conductors 18 and 44. This dimensional limitation permits the formation of any desired circuit path in the board by merely drilling through the board at selected locations. Specifically, any of the conductors 18 can be electrically disconnected from any one of the conductors 44 by merely drilling out the appropriate one of the plugs 40 and any one of the conductors 18 or 44 can be electrically interrupted by merely drilling through a neck portion of the conductor.

It will be noted from FIGURE 2 that when an individual plug 40 is removed by drilling, the electrical continuity of the associated conductors 18 and 44 is not interrupted although the two conductors involved (an 18 and a 44 conductor) will be electrically disconnected from each other. It will also be noted that when an individual neck portion 38 of one of the conductors 18 on side 6 is removed by drilling to form a discontinuity in the conductor, the drilled hole does not go through any of the conductors 44 on side 8 of the board. Similarly, any of the conductors 44 can be broken by drilling their neck portions without interruption of any of the conductors 18. When a neck portion 38 on side 6 is drilled, a shielding conductor 46 is also drilled on the side 8 of the board because of the very close spacing of the shielding and signal conductors; however, such breaks in the shielding conductors do not interfere with their shielding function since they are electrically connected between the sides 6 and 8 by numerous plugs 47.

A plurality of isolated metallic areas 48 equal to the number of surfaces 24 are provided on the side 8 and beneath the surface 24. These areas 48 are isolated from the conductors on the side 8 by insulating barriers 54. The metallic areas 48 are each connected as noted above, to the supporting surfaces 24 by means of plugs 50 as shown in FIGURE 3. The surfaces 48 thus provides additional heat-dissipating surfaces and the plugs 50 function to conduct heat from the surface 24 to the associated radiating surfaces 48.

The conductors 44/1, 44/3, 44/5, and the other conductors on the side 8 that have odd identifying numbers extend to the edges 10–16 and 12–14 of the board. These conductors have contact portions at the edges of the board, indicated along the edge 12–14 at 60/1, 60/3, etc. The contact portions along the edge 10–16 are similarly identified by the numerals 61/1, 61/3, etc. A suitable edge connector can be mounted on or against the edges of the board to make contact with the contact portions 60/1 and 61/1 of the conductors having odd identifying numbers. One such connector intended for use with the present board is described in my co-pending application Ser. No. 497,758, filed Oct. 19, 1965, although other arrangements might be used if desired. It will be noted that two edges of the board (12–14 and 10–16) are available for edge connectors as described more fully in my co-pending application Ser. No. 497,758, filed Oct. 19, 1965.

The conductors 44/2, 44/4, and the other signal conductors on the side 8 having even identifying numbers do not extend to the edges of the board as will be apparent from FIGURES 5 and 5A. These conductors in the disclosed embodiment are used to obtain specific circuit paths in the board but are not available for input signals. As shown in FIGURES 4 and 4A, none of the conductors 18 on the side 6 extend to the edges of the board and these conductors are not, therefore, used as inputs or outputs. The shielding conductors 46 on the side 8 of the board extend to the board edges 12–14 and 10–16 as shown at 64 and 66, each pair of adjacent shielding conductors being electrically integral at their ends with the edge portions 66 along the edges 10–16 and 12–14. If desired, electrical ground conductors can be connected to these edge portions of the shielding conductors although it is not always necessary to connect the grounds to these edge portions since the ground conductors can be otherwise electrically connected to the shielding conductors as will be described below. The edge portions 64 and 66 function to provide shielding for the signal conductors out to the edges of the board so that no unshielded signal conductors will exist in the finished board. As shown in FIGURES 4 and 4A, the ends 64 and 66 of the shielding conductors merge, on the side 6 of the board, with the conducting areas 25 and 27 which extend along the edges 10–16 and 12–14 respectively.

Ordinarily each of the integrated circuit units 17 mounted on the areas 24 will have one ground lead and one power lead. In order to provide power and ground inputs for all of the integrated circuit units mounted on the board, there is provided a bus-bar system which will now be described.

Referring to FIGURE 4A, it will be noted that the conductive areas 58 which extend alongside the heat-sink strip 22/1 are isolated on side 6 from the signal and shielding conductors on that side but are connected by plugs to selected signal and shielding conductors 44 and 46 on the side 8, see FIGURE 6. At their upper ends, as viewed in FIGURE 4A, these conductive areas 58 are connected by rectangular plugs 56 to common conductive areas 52 (see FIGURE 5A) on the side 8 which extend beside, but are isolated from, the associated heat-dissipating surface 48. At the upper ends of the areas 52, additional plugs 56 extend to the next adjacent areas 58 on side 6 which border the heat-sink strip 22/1. This pattern is repeated from the edge 14–16 to the edge 10–12 so that a continuous conducting path going from side to side is provided alongside the heat-sink strip 22/1. Two such conducting paths are thus provided, one on each side of the heat-sink strip 22/1. These paths constitutes bus bars extending on each side of the strip 22/1, one of which can be used for a ground and one of which can be used for a power input to the integrated circuit units mounted in the supporting areas 24.

The power input, for example, might be brought in through the conductor 44/1 and would be led to the area 58 in the left of FIGURE 6 by the plugs connecting 44/1 with this area. The other plugs would, of course, be removed. The power lead from the circuit unit 17 in FIGURE 4A would be welded to conductor 18/6 at one of the enlarged areas 36 thereof. The plugs associated with this conductor would then extend to one of the conductors 44/5, 44/6 * * * 44/11 which, in turn, is electrically connected to the common area 52. The conductors 44/5–44/11 not being used for power inputs would be electrically isolated from the area 52 by drilling holes at the appropriate locations.

In like a manner, the conductor 44/3 could be used as a ground input and connected to the bus-bar system extending along the right-hand side of the heat-sink strip 22/1. Since these conductors, 44/1 and 44/3 extend entirely across the board on the side 8, the bus-bar systems which extend beside the heat-sink strips 22/2 and 22/3 could also be connected to conductors 44/1 and 44/3 for power and ground inputs for the circuit units mounted on these other heat-sink strips.

Ordinarily, the shielding conductors throughout the board will be maintained at ground potential and, to this end, can be electrically connected to the ground input (e.g., the conductor 44/3) by the plugs shown in FIGURE 6 which extend from shielding conductors 46/1, 46/2, 46/3 and 46/4 to the conductive area 58.

It will be apparent from the foregoing description that numerous points in the board must be drilled when a specific circuit pattern is established since, in effect, the interconnected X–Y grid system is selectively broken or interrupted by drilling the pipes in the individual conductors to produce a specific pattern of conductors in the board extending between the twelve flat packs or integrated circuits on the board and extending to the contact portions of the conductors 44/1, 44/3, etc. in the edges of the board. The drilling or other removal of the plugs and the portions of the conductors extending between the pads may be accomplished mechanically by a relatively small twist drill, by an electron beam apparatus, or by a laser beam. In any event, and regardless of the type of apparatus used, the drilling operation is advantageously carried out by an apparatus under the influence of a program control device. The numerous drill holes required for such a device can be made quite rapidly and at a very low cost.

A distinct advantage of the disclosed embodiment of the invention is that one hole size will suffice to break the side-to-side connections between conductors and to break or interrupt the individual conductors of the groups. The rectangular plugs connecting the areas 52 to the areas 58 in the bus-bar system are not drilled since the power inputs and ground inputs all require the same potential.

The provision of the ground conductors or shielding conductors 20 and 46 is highly desirable, particularly on circuit boards in which the density of signal conductors is extremely high. A high density of signal conductors is, of course, desirable to provide a maximum amount of circuitry in a small volume. However, where the density of the signal conductors is extremely high (i.e., where the signal conductors are closely spaced) the possibility of crosstalk between adjacent conductors arises. Crosstalk can occur where very high frequencies are involved and also where the signals are pulses having extremely short rise times, a condition which commonly exists in ultrahigh speed computers and similar types of equipment. Such pulses having short rise times behave like RF signals and actually radiate into the space surrounding the signal line. The radiation can be picked up by adjacent signal lines as crosstalk and seriously impair the effectiveness of the circuit.

The geometry for the signal conductors shown in the disclosed embodiment not only minimizes the possibility of crosstalk between adjacent signal conductors but is also effective to maintain a uniform, or substantially uniform, characteristic impedance along the signal conductors. A brief discussion of this impedance consideration in its relationship to the geometry of the signal conductors is presented below.

As explained above, the enlarged areas or pads 36 on the signal conductors are provided in order to permit drilling through the pipes 40 to separate the signal conductors on one side of the board from the signal conductors on the other side. The neck portions 38 of the signal conductors have a width which is substantially equal to the diameter of the plugs 40 so that a single-sized drill or hole can be used to interrupt the side-to-side connecting plugs 40 and to interrupt the individual signal conductors 20. This geometry of alternate necks and pads in the signal conductors would normally result in a continually changing characteristic impedance along the signal conductors for the reason that the characteristic impedance as represented by the formula where $$Z_o=\sqrt{\frac{L}{C}}$$

$L$=inductance $C$=capacitance between the signal and ground conductors

The formulae for capacitance and inductance are as follows:

where $$C\alpha\frac{A_c}{d_c} \qquad L\alpha\frac{d_L}{A_L}$$

$A_c$=cross-sectional area between the side of a signal conductor and the side of an adjacent ground conductor as measursed normally of the board.

$d_c$=distance between adjacent signal and ground conductors.

$d_L$=distance between the centers of adjacent signal and ground conductors.

$A_L$=cross-sectional area of the signal conductor as measured in a plane extending transversely of its axis.

It will be apparent from the formula for characteristic impedance given above that if the ground conductor were formed as a simple strip of metal and without the laterally extending impedance compensating spurs, the characteristic impedance would change between each neck portion and pad portion of each signal conductor. Specifically, the capacitance C would decrease since $A_c$ remains constant and $d_c$ increases. The inductance L would increase in going from a pad area to a neck area since $d_L$ would remain constant while $A_c$ would decrease. The result of these changes would be that L would increase and C would decrease resulting in an increase in the characteristic impedance of the signal conductor.

The compensating spurs on the ground conductors which extend towards the neck portions of the signal conductors are designed to minimize or eliminate changes in the characteristic impedance along the langths of the signal conductors by introducing changes in $d_c$ to compensate for the changes in $A_L$.

It is not intended to imply that the edges of the pad portions of the signal conductors and the compensating spurs on the ground conductors will necessarily be shaped precisely as shown in the drawing. Depending upon the variables present such as the spacing between adjacent pad portions on the signal conductors and the spacing between the signal conductors and the ground conductors, it may prove feasible to round the corners of the pads and the compensating spurs and to shape the spurs and neck portions of the signal conductors in a manner such that optimum compensation is achieved. The determination of the optimum geometry for the signal and ground conductors can be determined for a particular set of conditions by mathematical analysis and/or empirical determination of parameters involved.

Figure 7:
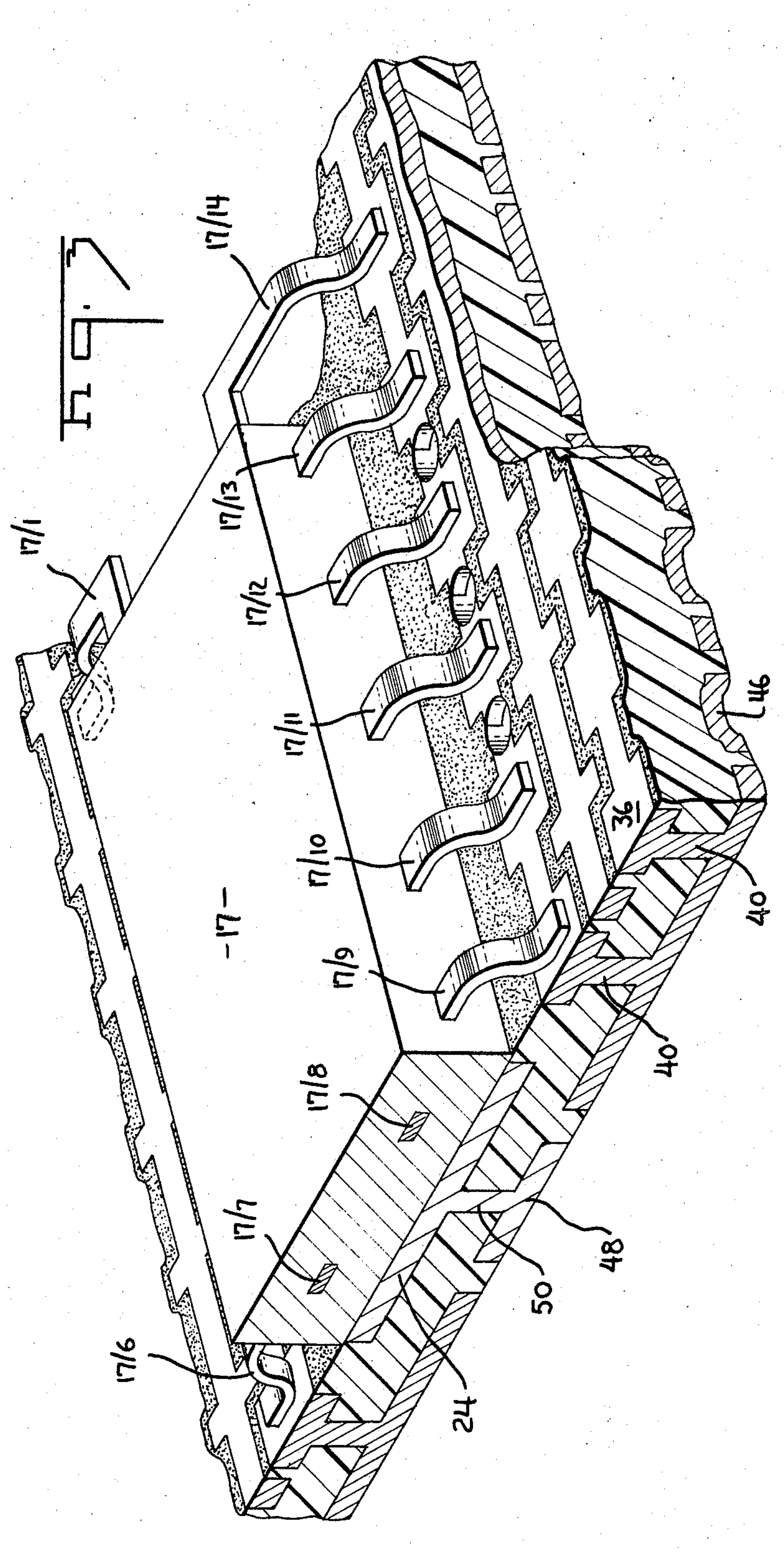
FIGURE 7 is a schematic view of a board which illustrates the manner in which specific circuit paths can be achieved by removal of portions of the signal conductors of the board, the shielding conductors having been eliminated from this view in the interest of clarity.

FIGURE 7 is a schematic representation of a basic circuit with appropriate symbols to represent side-to-side connections (through the pipes 40) interrupted conductors, and components or integrated circuit leads which are welded to the pads of adjacent signal conductors. The shielding conductors have been eliminated from the view in order that it may be more readily understood but it can be assumed that these shielding conductors extend between these signal conductors used. As noted on the drawing, it is assumed in this figure that all of the side-to-side connections between the active conductors 44 and the inactive conductors 18 have been eliminated by drilling the appropriate plugs 40 except those connections specifically indicated by a dark circle. It is also assumed that all of the inactive signal conductors (those which are not utilized in the particular circuit board) have been electrically isolated from the active signal conductors by drilling through the board at the appropriate locations. These additional drilled holes, which are not shown in FIGURE 7 would, if shown, confuse this figure and have not been shown for that reason. The twelve component mounting areas 24 in FIGURE 7 are each assumed to have an integrated circuit unit mounted thereon and each circuit unit is assumed to have fourteen leads extending therefrom. The individual integrated circuit units are identified by the letters A, B, C * * * L and the leads extending from each circuit unit are numbered 1–14, counting in a counterclockwise direction around the circuit unit. Thus, the circuit component D in FIGURE 7 has its number 1 lead connected to the conductor 18–6 and lead number 14 of this circuit unit is connected to conductor 18–7.

The numerous circuit paths between the leads of the individual circuit units can readily be traced in FIGURE 7 by observing the drawing conventions (conductor interrupts, side-to-side connections, and component lead connections to the conductors) set forth. For example, lead 3 of circuit unit B (i.e., B3) is welded to a pad portion 36 of conductor 18–6. The particular pad portion to which lead B3 is welded is isolated as shown by the three conductor interruptions which surround the weld and a side-to-side connection is provided to connect conductor 18/6 with conductor 44/19 of the underside 8 of the board. Conductor 44/19, in turn, extends to the edge 10–16 at contact area 60/19. The edge connector mounted against the edge 10–16 would thus have a contact in engagement with contact area 60/19 to carry an input signal through this contact area via lead B3 to circuit unit B. To consider lead F1 from circuit unit F, as a further example, this lead is connected to conductor 18/17 by a weld as shown and the pad on which the weld is made is isolated on three sides. Conductor 18/17 extends upwardly, as viewed in the drawing, and has a side-to-side connection or pipe to conductor 44–22. Conductor 44–22, in turn, extends to, and is connected to, conductor 18–21 by way of a side-to-side connection which, in turn, extends to conductor 44–16. Conductor 44–16, in turn, extends to conductor 18–28 and lead J6 is connected to this conductor as indicated.

If micro-miniature components are used rather than integrated circuit units, such components could be mounted on the areas 24 of the board and would have their leads welded to conductors 18 as described above. A circuit board in accordance with the invention also permits the mounting of discrete or individual circuit components on areas other than the supporting areas 24. For example, an individual resistor could be mounted in the conductor 44–19 between the contact surface 60–19 and the lead B3. This could be done by drilling a neck portion 38 of the conductor 44–19 and welding the leads of the individual resistor on the adjacent pad portions 36. Under some circumstances, such hybrid circuit arrangements are used to change the functions of the flat packs.

One method of manufacturing a circuit board in accordance with the invention is to initially form the insulating matrix 4 by a molding process or by impressing the pattern of the conductors on the surface of a suitable thermo-plastic material and punching holes for the plugs 40. The metallic conductors and the pipes are then electrodeposited in the holes and in the recesses or channels on the surface of the insulating matrix until the electro-deposited metal is level with the surfaces 6, 8 of the board. This manufacturing procedure will, if properly controlled, result in the formation of the depressions 42 in alignment with the plugs and will thereby provide a convenient locating means for locating the centers of the drill holes.

FIGURE 8 shows a modified form of circuit board in accordance with the invention in which a central ground plane 70 extends from the plugs which connects these shielding conductors. This board is in other respects similar to the board described above but has the advantage of additional shielding for the signal conductors but where the noise level must be kept at absolute minimum.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. A panel-like member for making electrical interconnections, said member being of insulating material and having a first group of parallel signal conductors on one side thereof and a second group of parallel signal conductors on the other side thereof, said first group of signal conductors extending transversely of said second group of signal conductors whereby the signal conductors of said first and second groups cross each other at first coordinate positions on said member, all of said signal conductors having laterally enlarged portions at said coordinate positions and having neck portions extending between said laterally enlarged portions, each laterally enlarged portion on said one side of said member being in alignment with a laterally enlarged portion on the other side of said member, a first group of conducting plugs extending through said member at all of said first coordinate positions, each of said first group of plugs being integral with a conductor of said first group and a conductor of said second group at its ends, first and second groups of shielding conductors on said one side and on said second side respectively, said shielding conductors extending parallel to, and between, said signal conductors whereby said first and second groups of shielding conductors cross each other at second coordinate positions displaced from said first coordinate positions, all of said shielding conductors having laterally enlarged portions at said second coordinate positions and having neck portions extending between said laterally enlarged portions, a second group of conducting plugs extending through said member at all of said second coordinate positions, each of said second groups of plugs being integral with one of said shielding conductors at its ends, all of said plugs having a maximum width which is substantially equal to the width of said neck portions whereby, said plugs are removable from said member thereby to interrupt circuit paths extending from signal or shielding conductors of said first groups to signal or shielding conductors of said second groups without interrupting the conductors of said groups, and portions of said neck portions of said signal and shielding conductors of said first and second groups being removable to interrupt specific conductors of said first and second groups of signal and shielding conductors.

2. A device as set forth in claim 1 including a first plurality of shielding conductors on said one side and a second plurality of shielding conductors on said other side, said shielding conductors extending parallel to said signal conductors, each shielding conductor extending between a pair of adjacent signal conductors, said first plurality of shielding conductors being connected by a second group of connecting pipes to said second plurality of signal conductors, said first and second plurality of shielding conductors and said second group of connecting pipes constituting a shielding network which is electrically independent of said first and second groups of signal conductors.

3. A device as set forth in claim 1 including a plurality of component supporting conductive bands extending across said panel-like member for supporting electrical components, said bands being electrically isolated from all of said signal and shielding conductors.

4. A device as set forth in claim 1 wherein at least some of said signal and shielding conductors extend to the edges of said member to provide contact areas for edge connectors for said member.

5. A device as set forth in claim 1 including a plurality of component supporting conductive bands extending across said panel-like member for supporting electrical components, said bands being electrically isolated from all of said signal and shielding conductors, and further including bus bar means on said member extending alongside said bands, said bus bar means being electrically connected to some of said signal conductors by connecting plugs.

6. A device as set forth in claim 1 wherein alternate conductors of one of said groups extend to opposite edges of said board to provide contact areas for edge connections to said board.

References Cited

UNITED STATES PATENTS

| | | | |
|---|---|---|---|
| 3,033,914 | 5/1962 | Acosta-Lleras | 174—68.5 |
| 3,128,332 | 4/1964 | Burkig et al. | 174—68.5 |
| 3,293,353 | 12/1966 | Hendriks et al. | 174—36 |
| 3,305,622 | 2/1967 | Bergsman et al. | 174—68.5 X |

DARRELL L. CLAY, *Primary Examiner.*

UNITED STATES PATENT OFFICE
CERTIFICATE OF CORRECTION

Patent No. 3,398,232 August 20, 1968

Norman Edwin Hoffman

It is certified that error appears in the above identified patent and that said Letters Patent are hereby corrected as shown below:

Column 10, line 14, beginning with "2. A device" cancel all to and including "conductors." in line 26, same column 10; line 27, "3." should read -- 2. --; line 32, "4." should read -- 3. -- line 36, "5." should read -- 4. --; line 45, "6." should read -- 5. --. In the heading to the printed specification, line 8, "6 Claims" should read -- 5 Claims --.

Signed and sealed this 3rd day of February 1970.

(SEAL)
Attest:

Edward M. Fletcher, Jr.
Attesting Officer

WILLIAM E. SCHUYLER, JR.
Commissioner of Patents